United States Patent [19]

Christian

[11] Patent Number: 5,270,751
[45] Date of Patent: Dec. 14, 1993

[54] STEROSCOPIC OPTICAL APPARATUS FOR USE WITH TELEVISION AND VIDEO RECORDING EQUIPMENT

[76] Inventor: John A. Christian, 5 Towers Way, Corfe Mullen, Wimborne, Dorset BH21 3UA, England

[21] Appl. No.: 8,416

[22] Filed: Jan. 25, 1993

Related U.S. Application Data

[63] Continuation of Ser. No. 612,421, Nov. 13, 1990, abandoned.

[51] Int. Cl.⁵ .................. G03B 21/28; G03B 35/22
[52] U.S. Cl. .......................... 353/7; 359/464; 359/466; 359/471; 359/473; 359/477; 352/57
[58] Field of Search ........................ 353/7-8, 353/10; 352/62-63, 57, 60, 65, 86; 358/88, 3; 359/464, 466, 471-473, 477-479

[56] References Cited

U.S. PATENT DOCUMENTS

| | | | |
|---|---|---|---|
| 2,063,004 | 12/1936 | Louisot | 353/7 |
| 2,559,698 | 7/1951 | Bahre | 350/145 |
| 2,751,826 | 6/1956 | Harrison | 352/60 |
| 2,837,967 | 6/1958 | Grey | 350/137 |
| 3,232,166 | 2/1966 | Matague | 353/10 |
| 4,027,947 | 6/1977 | Taylor | 350/133 |
| 4,080,629 | 3/1978 | Hammond et al. | 358/108 |
| 4,174,884 | 11/1979 | Weissler | 350/139 |
| 4,568,970 | 2/1986 | Rockstead | 358/88 |
| 4,756,601 | 7/1988 | Schröder | 358/88 |
| 4,875,064 | 10/1989 | Umeda et al. | 353/122 |
| 4,967,267 | 10/1990 | Gallaher, Jr. | 358/88 |

FOREIGN PATENT DOCUMENTS 0548158 9/1942 United Kingdom.

Primary Examiner—William A. Cuchlinski, Jr.
Assistant Examiner—William C. Dowling
Attorney, Agent, or Firm—Iandiorio & Dingman

[57] ABSTRACT

Stereoscopic optical apparatus comprising a housing constructed to exclude spurious light sources, first and second optical devices having reflecting surfaces which together form a first pair of optical devices, and third and fourth optical devices having reflecting surfaces which together form a second pair of optical devices. The stereoscopic optical apparatus being such that the first optical device is positioned below the second optical device and the third optical device is positioned below the fourth optical device, the first and third optical devices are inclined a first way and the second and fourth optical devices are inclined a second way. One of the optical devices from the first and second pairs of optical devices being such as to form two optical devices which are level and have their optical center lines separated by a distance, "d", said pairs of optical devices providing left and right views of an object. The stereoscopic optical apparatus being such that it is able to operate in a recording mode for recording images in a camera and in a viewing mode for translating an electronic or photographic display into a human viewable form.

5 Claims, 4 Drawing Sheets

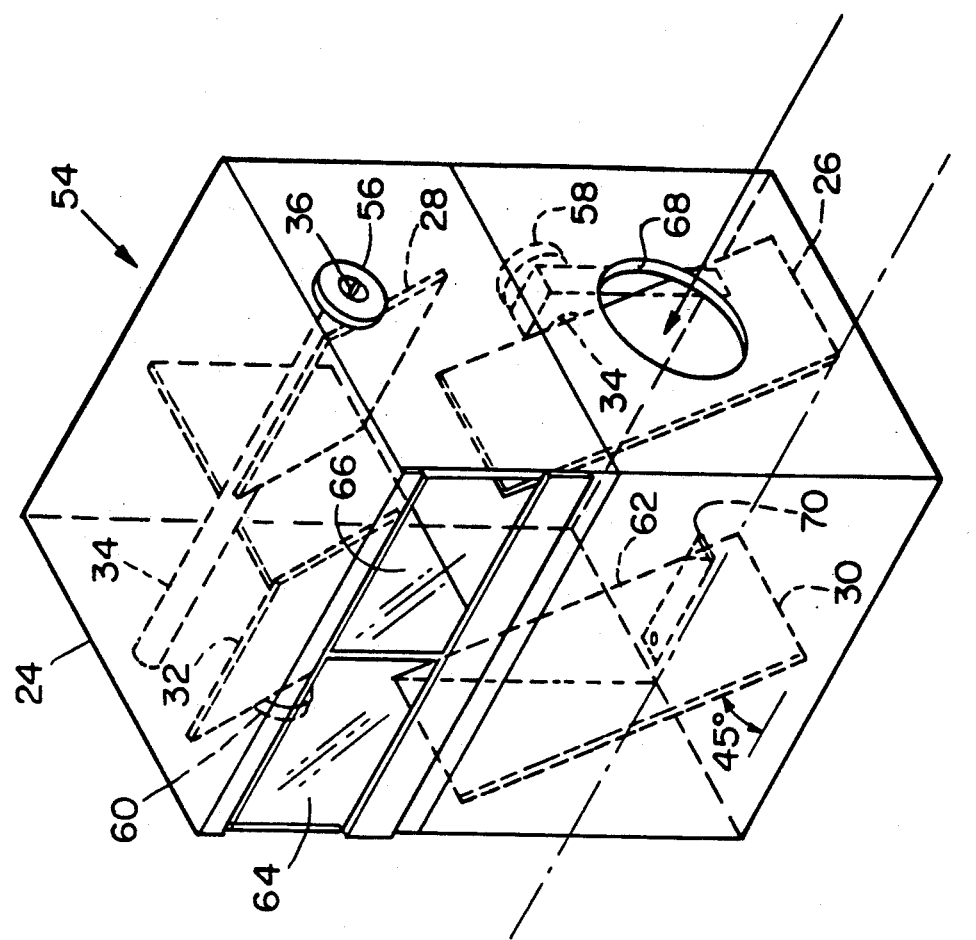
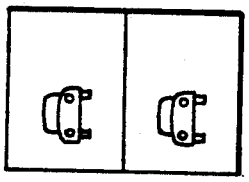
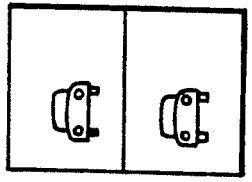
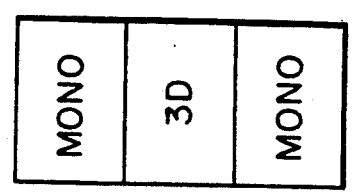
FIG. 4
FIG. 6

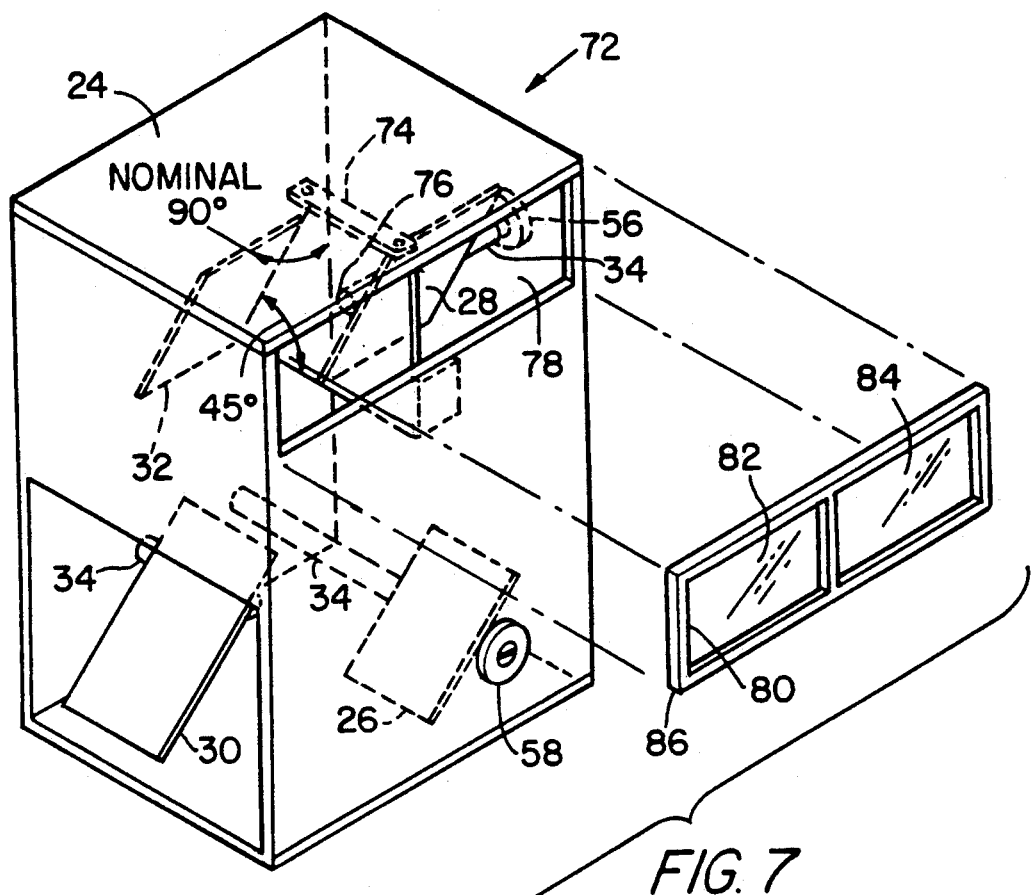
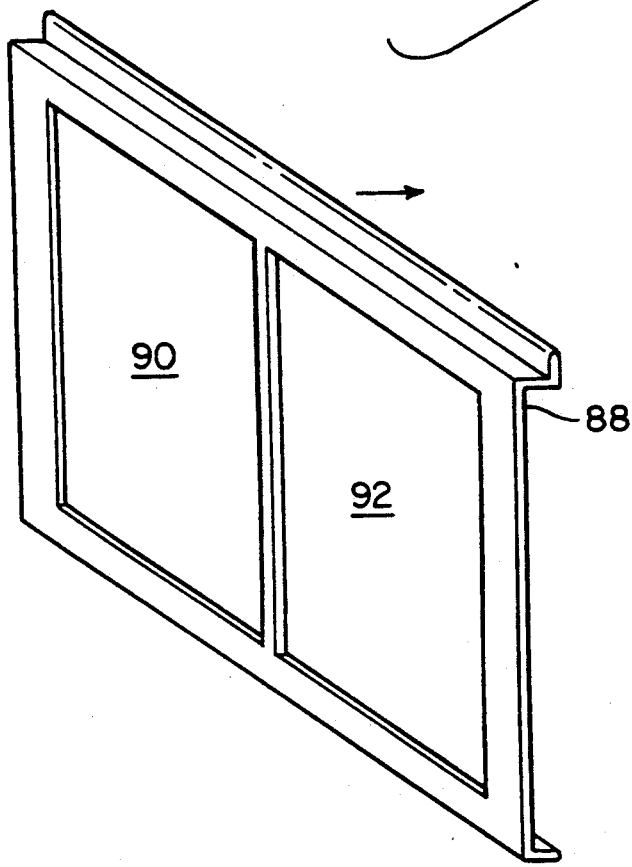
FIG. 7
FIG. 8

STEREOSCOPIC OPTICAL APPARATUS FOR USE WITH TELEVISION AND VIDEO RECORDING EQUIPMENT

This is a continuation of application Ser. No. 07612,421, filed Nov. 13, 1990 now abandoned.

This invention relates to stereoscopic optical apparatus for use with television and video recording equipment.

Known stereoscopic apparatus for use with television and video recording equipment is usually of a complex electronic nature. The complex electronics in the known stereoscopic electronic apparatus usually means that the apparatus is not easily compatible with ordinary televisions, video cameras, video recorders and projectors.

It is an aim of the present invention to provide stereoscopic optical apparatus which reduces the above mentioned problem.

Accordingly, this invention provides stereoscopic optical apparatus for use with television and video recording equipment, which stereoscopic apparatus comprises a housing which is constructed to exclude spurious light sources, a pair of first ports in a first face of the housing, a second port in a second face of the housing, first and second optical devices which each have a reflecting surface and which together form a first pair of optical devices, and third and fourth optical devices which each have a reflecting surface and fourth optical devices which each have a reflecting surface and which together form a second pair of optical devices, and the stereoscopic optical apparatus being such that:

(a) the first optical device is positioned below the second optical device;

(b) the first optical device is inclined with respect to horizontal and has an edge which lies in a vertical datum plane extending through a centre of the device;

(c) the first optical device is rotatable about a horizontal axis which is perpendicular to the vertical datum plane such that the said edge of the first optical device remains in the vertical datum plane;

(d) the second optical device has an upper edge which lies in the vertical datum plane;

(e) the second optical device is rotatable about its upper edge;

(f) the second optical device is inclined with respect to the vertical datum plane;

(g) the third optical device is positioned below the fourth optical device;

(h) the third optical device is inclined with respect to horizontal;

(i) the third optical device has an edge which lies in the vertical datum plane;

(j) the fourth optical device has a lower edge which lies in the vertical datum plane;

(k) the fourth optical device is rotatable about its lower edge; and (l) the fourth optical device is inclined with respect to the vertical datum plane; and (m) one of the optical devices from the first pair of optical devices and one of the optical devices from the second pair of optical devices being such as to form two optical devices which are on the same level and aligned with said pair of first ports and which have their optical center lines separated by a distance, "d", said pairs of optical devices providing left and right view images of an object that can be detected and recorded, said distance "d" being interpreted by a human brain to be the human inter-ocular distance when said recorded left and right images are viewed by left and right human eyes respectively;

The stereoscopic optical apparatus being such that it is able to operate in a recording mode for recording images in a camera when the first ports are used as entry ports and the second port is used as an exit port, and the stereoscopic optical apparatus being such that it is able to operate in a viewing mode for translating an electronic or photographic display into a human viewable form when the first ports are used as exit ports and the second port is used as an entry port.

The stereoscopic optical apparatus of the present invention may have three related constructions. Two of these constructions may be used for viewing, one being for projection. The third construction may be used for recording.

Preferably, the housing has a matt black inner surface. Also preferably, the housing has a matt black outer surface. The matt black surfaces act to exclude the spurious light sources.

The four optical devices are preferably four mirrors. Alternatively, the four optical devices may be four prisms. It is preferred to use four mirrors as they tend to give clearer images than prisms, and they also lend themselves to simpler constructions than with prisms.

In one embodiment of the invention, the stereoscopic optical apparatus is produced as stereoscopic optical viewing apparatus and, in this embodiment, there is one pair of the optical devices for each eye. In each periscope-type device, the top portion is rotated 90° clockwise from a conventional periscope when seen in plan view.

The stereoscopic optical viewing apparatus may be produced as an individual viewer, which is for use at a short distance in front of a viewer's face, and which is intrinsically adjustable for various sizes of television screen and distances from the television screen. An indefinite number of these devices may be used with a given television screen, using one per person who wants to watch.

Alternatively, the stereoscopic optical viewing apparatus may be produced as multiple stereoscopic optical viewing apparatus used in combination with a projector, the latter preferably being one of the designs in which all three primary colours emerge through the same lens.

The most flexible and relaxed stereoscopic viewing may be achieved using the multiple viewing arrangement where there is complete freedom of movement in front of the screen. However, the individual stereoscopic optical viewing apparatus has two advantages. It can be used in combination with a domestic television set, and television sets may give higher resolution pictures than some single lens video projectors. With the individual viewer, polarising film may be an integral part of the viewing assemblys but polarising film is not essential. With the multiple stereoscopic optical viewing apparatus, persons viewing will normally need to wear polarised spectacles.

In another embodiment of the invention, the stereoscopic optical apparatus is produced as stereoscopic optical recording apparatus. With such stereoscopic optical recording apparatus, the top portion of each periscope-type device is rotated anti-clockwise 90° from a conventional periscope when seen in plan view, as opposed to being rotated 90° clockwise in plan view in the stereoscopic optical viewing apparatus.

The stereoscopic optical recording apparatus may be attached to an unmodified camera, of which the viewfinder is angled to the optional vertical position. The two pairs of optical devices will usually be mounted one behind the other, either side of the centre line through the camera lens, sharing a common extended base plate with the camera. Vertical mounting adjustment may be necessary to bring the two pairs of optical devices to the appropriate level for the camera lens. The camera is preferably a camcorder, but it may be a camera with a separate recorder, or a television camera appropriately connected to recording equipment. Pictures may also be viewed as live stereoscopic images directly off the camera. The stereoscopic camera attachment could also be used in combination with a film camera.

In a further embodiment of the invention, the stereoscopic optical apparatus is produced as stereoscopic optical projection apparatus in which the top portion of each pair of optical devices is rotated anti-clockwise 90° with respect to a conventional periscope device, the stereoscopic optical projection apparatus being used for stereoscopic projection and multiple viewing of a screen.

The stereoscopic optical projection apparatus is equally applicable to a film projector or a single lens video projector.

In the stereoscopic optical apparatus of the present invention, one of the reflecting surfaces gives vertical alignment of the two images, and another of the reflecting surfaces gives horizontal alignment of the two images. The stereoscopic optical apparatus may be such as to include correction means for ensuring that the verticals in the two separate images are parallel to one another. In other words, the correction means ensures that the images are on top of one another and are not at an angle to one another. The correction means will usually only need to be operated once and then it will be set correctly for all the time during normal use of the stereoscopic optical apparatus.

The correction means may be a supporting surface for one of the reflecting surfaces when the optical devices are in the form of mirrors, the supporting surface being such that it is deformable at its inside sloping edge to an angle which is adjusted from a nominal 90° with a vertical datum plane. One presently preferred such supporting surface is formed by an aluminium plate. The aluminium plate is preferably black except for where it supports the reflecting surface.

Any one of the four reflecting surfaces may be provided with the correction means. The adjustment may consist of rotation of the reflecting surface about its inside sloping edge which is that farthest from the outside of the housing.

The present invention also extends to the stereoscopic optical viewing apparatus and the stereoscopic optical recording apparatus in combination.

Embodiments of the invention will now be described solely by way of example and with reference to the accompanying drawings in which:

FIG. 4 illustrates a left eye view, a right eye view, and a combined left and right eye view as perceived with a television screen;

FIG. 6 shows stereoscopic optical apparatus in the form of stereoscopic optical viewing apparatus produced as a projector attachment;

FIG. 7 shows stereoscopic optical apparatus produced as stereoscopic optical viewing apparatus produced as a television viewer;

FIG. 8 shows a frame for use with the television viewer shown in FIG. 7; and

Figure 1:
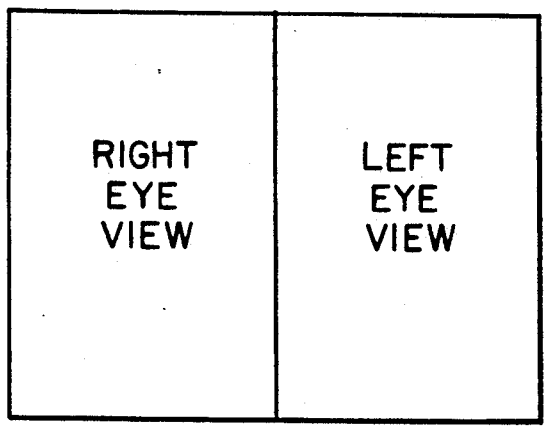
FIG. 1 illustrates how left and right eye images are displayed on a television screen.

Referring to FIG. 1, the invention is able to convey stereoscopic images from an original scene using a single colour camera, standard television or video system and an unmodified television receiver or monitor. The stereoscopic apparatus may be produced as an add on facility at both the sending and receiving ends. A mono image may still be viewed on the television screen whilst receiving stereo, if the stereoscopic optical apparatus is not available.

Essentially, the camera field of view is divided down the middle. Left and right eye images are then conveyed to each half-picture through two reflecting surfaces such that the scene is still recorded in landscape format. Both left handed and right handed assemblies are possible but the one currently described is suited to right handed operation of the camera. The resulting format displayed on a television screen is shown in FIG. 1.

Stereoscopic viewing of the receiver may be achieved with a four mirror assembly similar to that used for the camera. Such stereoscopic viewing apparatus may be in the form of an individual viewer conveniently supported near the right elbow when sitting in an armchair. The use of polarised film greatly assists stereo viewing but is not essential with personal stereoscopic optical viewing apparatus.

Figure 2:
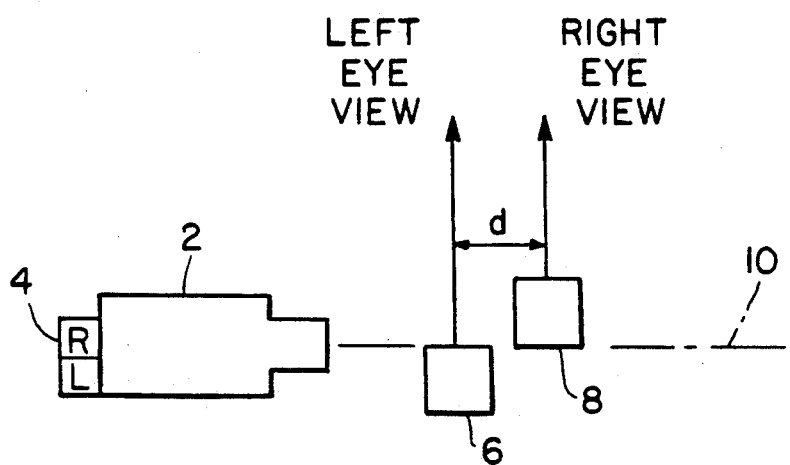
FIG. 2 is a plan view of a camera attachment.

FIG. 2 shows a plan view of a camera arrangement and it will be seen that FIG. 2 discloses an unmodified camera having a viewfinder 4. The viewfinder 4 is rotated to a vertical position. Right and left eye images are viewed one above the other by looking downwards into the viewfinder 4. FIG. 2 shows the centre line of the camera lens assembly. FIG. 2 also shows somewhat schematically a left eye view and a right eye view separated by a distance "d". The distance "d" is the effective inter-ocular separation. A typical average value is 63.5 mm.

FIG. 2 has a pair of periscope-type devices 6, 8 with the device 6 giving the left eye view, and with the device 8 giving the right eye view. In each device 6, 8 the top mirror is rotated anti-clockwise by approximately 90°.

The unmodified camera 2 is operated from sideways on, with the viewfinder 4 angled to the vertical position as stated. The unmodified camera 2 looks into the bottom of the two devices 6, 8 which are mounted one on either side of the centre line 10 of the lens assembly.

Figure 3:
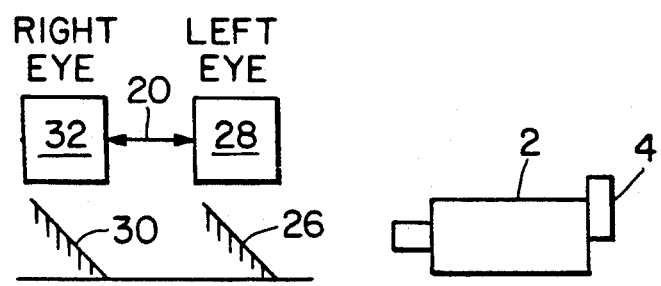
FIG. 3 is a side view looking into the camera assembly, as seen by a photographed subject.

Referring now to FIG. 3, there is shown a view looking into the camera assembly, as seen by a photographed subject. Four mirrors 32, 28, 30, 26 are shown. The mirrors 32, 28 are angled mirrors which reflect horizontal light from a subject (in the reader's position)

downwards. The lower mirrors 30, 26 are angled as shown and they are able to receive the reflected light from above. The unmodified camera 2 is positioned as shown. In FIG. 3, the unmodified camera 2 may be tilted downwards to assist camera operation. The mirrors 32, 28, 30, 26 may be of any desired and appropriate size. The mirrors 32, 30 need to be increased in size if the inter-ocular separation gap 'd' is increased to exaggerate depth. It should also be noted that the mirrors 32, 30 for the right eye view may in any case be larger than the corresponding mirrors 28 and 26 for the left eye view in order to optimise the use of mirror areas. The gap 20 in FIG. 3 has been shown for clarity of illustration.

Referring now to FIG. 4, there is shown a left eye view, a right eye view, and a combined left and right eye view as seen on a T.V. screen. The top image of the car in the left eye view is unwanted. The bottom image of the car in the right eye view is also unwanted. These two unwanted mono images can be blocked out. The blocking may be effected by physical masking, or adjusting the eye to viewer distance such that only wanted halves of the screen are seen. The use of a polarising film is however preferable for effecting the blocking. The polarising film copes well with various television screen sizes and also with various distances from the television. It is best mounted over the viewing apertures rather than in spectacles.

Figure 5:
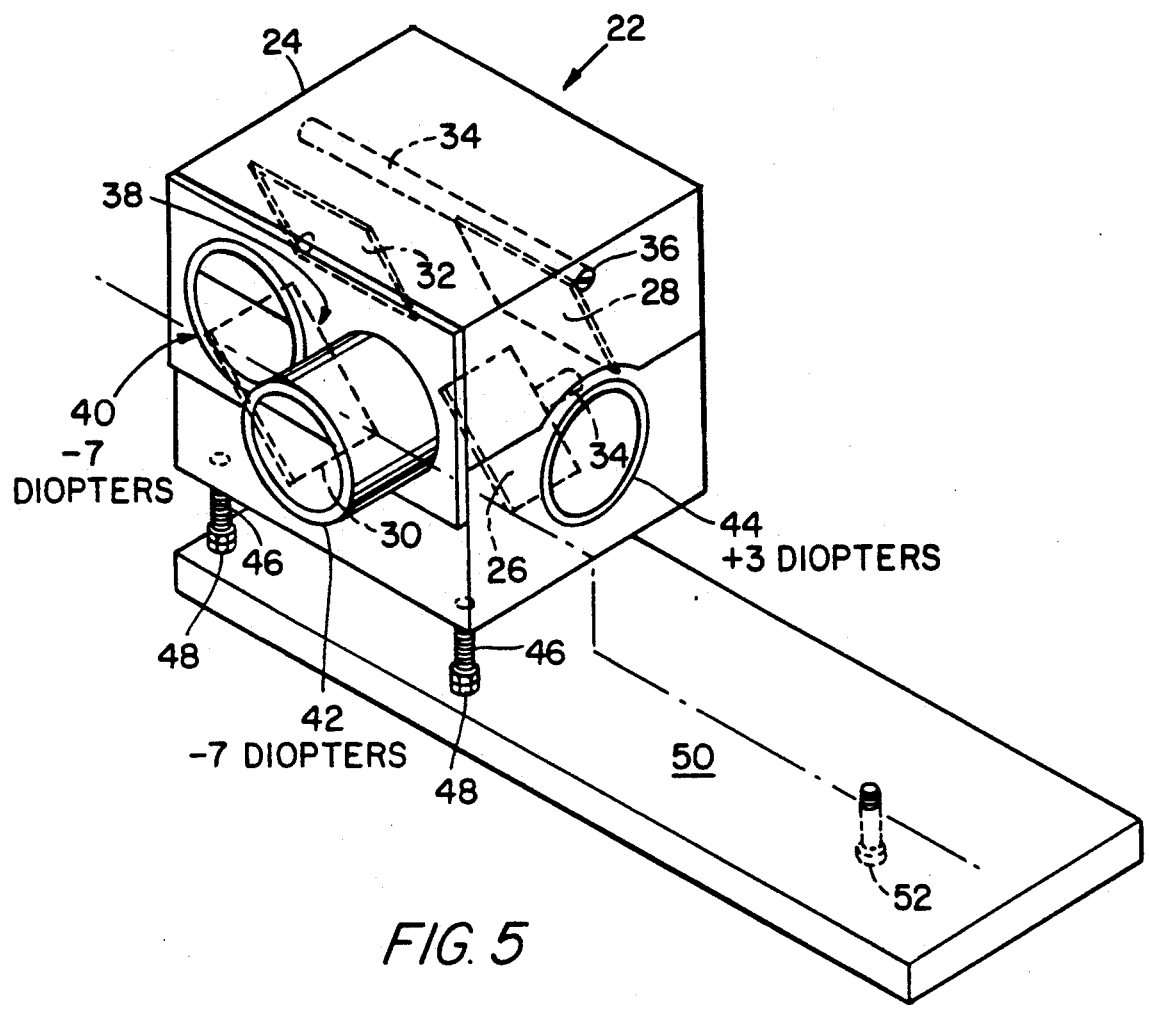
FIG. 5 illustrates stereoscopic optical apparatus in the form of stereoscopic optical recording apparatus produced as a camera attachment.

Referring now to FIG. 5, there is shown stereoscopic optical apparatus in the form of stereoscopic optical recording apparatus which has been produced as a camera attachment 22. The camera attachment 22 comprises a housing 24 which has inner and outer black matt surfaces for excluding spurious light sources. Four separate optical devices in the form of four mirrors 26, 28, 30, 32 are provided in the housing 24. The mirrors 26, 28, 30, 32 each provide a reflecting surface. The mirrors 26, 28, 30, 32 are arranged in pairs 26, 28, and 30, 32 to form two periscope-type devices. The top portion of each periscope-type devices is formed by the top mirrors 28 and 32 and these top mirrors are turned through 90° with respect to a conventional periscope device in order to rotate an image through 90° during use of the camera attachment 2. More specifically, the top mirrors 28 and 32 have been rotated anti-clockwise 90° from a conventional periscope when seen in plan view.

The mirror 28 is mounted on a rod 34. A screw adjustment 36 is provided in order to enable the mirror 28 to be set up for vertical alignment of images. The mirror 26 is similarly provided with a rod 34 and screw adjustment 36 (not shown) in order to enable the mirror 26 to be set up for horizontal alignment. The mirror 32 may be similarly adjusted.

The mirror 30 may be rotated about axis 38 in order to eliminate angular error between the left and right images.

The housing 24 is provided with a minus seven diopter lens 40, a minus seven diopter lens 42 and a plus three diopter lens 44 as shown.

The housing 24 is mounted on screw threaded legs 46 as shown. Locknuts 48 are provided at the bottom of the legs 46 to enable screw threads to be retained and adjusted by screw heads underneath. Three threaded holes in the bottom of the housing 24 thus allow the screws to adjust the height of the camera attachment 22 for the particular camera (not shown) to be used. The legs 46 upstand from and mount the housing 24 on a base member 50. The base member 50 has an upstanding tripod screw member 52 for enabling a camera (not shown) to be secured to the base member 50.

The mirror 32 may be 75 mm×75 mm, the mirror 30 may be 80 mm×35 mm, the mirror 28 may be 50 mm ×50 mm, and the mirror 26 may be 50 mm×30 mm. The rod 34 for the mirror 28 may be 9 mm lower than the top of the mirror 32. This means the top of the smaller mirror is 9 mm vertically below the top of the larger one (which is 5 mm square).

Referring now to FIG. 6, there is shown stereoscopic optical apparatus in the form of stereoscopic optical recording apparatus which has been produced as a projector attachment 54. For ease of comparison and understanding, similar parts as in FIG. 5 have been given the same reference numerals.

In FIG. 6, the top rod 34 is provided with a knob 56 for enabling easy rotation of the mirror 28 to adjust the vertical position of one image on a projector screen (not shown). Similarly, the rod 34 for the lower mirror 26 is provided with a knob 58 for easy rotational adjustment of the mirror 26 in order to adjust for merging images horizontally. The mirror 32 is provided with an adjustment knob 60 for providing easy rotational adjustment of the mirror 32 and thus the vertical position of the second image on the screen.

The mirror 30 is mounted at 45° to the horizontal. It may be rotated about a hinge axis 62 to correct for rotational discrepancies between left and right eye images during initial assembly of the projector attachment 54.

The housing 24 is provided with filter sheets 64, 66 to cause opposite polarisation of images on the screen. A projector beam for the screen passes through a beam aperture 68 in the housing 24.

The mirror 30 may be supported by an aluminium base plate 70.

The mirrors 28 and 32 may be 74×80 mm, whilst the mirrors 26 and 30 may be 52×113 mm. Mirrors of other dimensions may of course be employed.

Referring now to FIG. 7, there is shown stereoscopic optical apparatus in the form of stereoscopic optical viewing apparatus produced as a television viewer 72. For ease of comparison and understanding, similar parts as in FIGS. 5 and 6 have been given the same reference numerals.

The mirror 28 is mounted on a rod 34 which, in addition to its support at its adjustment end, may be supported at a pivot 76. Adjustment of the mirror 28 adjusts for merging images vertically. Adjustment of the mirror 26 adjusts for merging images horizontally. The mirror 30 is a fixed mirror.

The mirror 32 is provided with correction means. More specifically, the mirror 32 is supported on a soft aluminium plate. Thus the mirror 32 may be rotated slightly about its inside sloping edge by bending the angle of the aluminium plate during initial assembly. This ensures that the verticals in the two separate images are parallel to each other. The mirror 32 may be set at a nominal 90° angle and then adjusted to eliminate any rotational discrepancy between verticals of the two images.

The mirrors 28, 32 may be 64×79 mm. The mirror 26 may be 46×92 mm. The mirror 30 may be 60×120 mm. Other sizes for the mirrors may of course be employed.

The housing 24 has a viewing aperture 78. If desired, a polarising device 80 may be positioned at the viewing aperture 78. The polarising device 80 then assists glasses-free viewing. The polarising device 80 has polarising filters 82, 84, somewhat similar to the filter sheets 64, 66 shown in FIG. 6. The polarising filters 82, 84 are mounted in a frame 86. The frame 86 may be attached by Velcro (registered trade mark) pads (not shown) to the housing 24. Other attachment means for attaching the frame 86 in position may of course be employed.

Referring now to FIG. 8, there is shown a frame 88 for supporting opposite polarising filter sheets 90, 92. The filter sheets 90, 92 may be 220×340 mm in size but other sizes of filter sheets may be employed. The frame of the size mentioned may be fitted to a television screen size up to 22 inches and it may be secured to the television set by any suitable and appropriate attachment means such for example as detachable Velcro (registered trade mark) pads (not shown).

The stereoscopic optical apparatus of the present invention is advantageous in a number of aspects. Thus, for example, the stereoscopic optical apparatus does not present too much of a problem to any one wishing to view without the stereoscopic facility. Glasses-free flat picture viewing of a television can be achieved by a viewer either lying down to watch or alternatively standing a portable television upon its side. Known stereoscopic apparatus is virtually unwatchable without special equipment.

The stereoscopic optical apparatus may be produced at relatively low cost using, for example, one unmodified camcorder, television or projector. No electronic adaption of televisions or video systems is necessary, The stereoscopic optical apparatus is ideally suited to the current aspect ratio of 4:3, and is compatible with PAL, NTSC, SECAM, MAC and the various recording systems which they use. Thus, for example, Video 8 may be employed to record PAL.

The stereoscopic optical apparatus of the present invention may be produced to give no more flicker than ordinary televisions during use. Images are viewed simultaneously and not alternatively as in some known stereoscopic systems, which show left and right images alternately. The clarity obtained using the apparatus of the present invention is excellent.

No control cable is necessary to the viewing assembly, as is required with one known type of stereoscopic apparatus which uses liquid crystal spectacles.

The stereoscopic optical apparatus of the present invention is such that colours are not compromised by colour filters.

A television screen may be seen by using a viewer apparatus virtually anywhere in front of the television. Sideways movement of the viewer apparatus is not critical, as it would be for someone viewing with a lenticular screen system which limits the choice of viewing position.

Adjustment of the separation between lens axes for the purpose of close up or distance shots is relatively easy. Mild exaggeration of picture depth may be obtained relatively easily by appropriate adjustment.

Tapes may be viewed and edited without stereoscopic viewing equipment as the two pictures are separate. A portable television may be used on its side to view them upright. Broadcasters may choose to transmit 3D films in the format used in the stereoscopic optical apparatus of the present invention.

The stereoscopic optical apparatus may be attached to home cine cameras as the aspect ratio is the same.

It is to be appreciated that the embodiments of the invention described above with reference to the accompanying drawings have been given by way of example only and that modifications may be effected. Thus, for example, an alternative construction of a mirror assembly for either television or camera use, would be to operate twisted periscope-type devices upside down. Front aluminised mirrors may be employed in part or whole as alternatives to back silver mirrors which are cheaper. Prismatic alternatives to mirrors may also be used.

Figure 9:
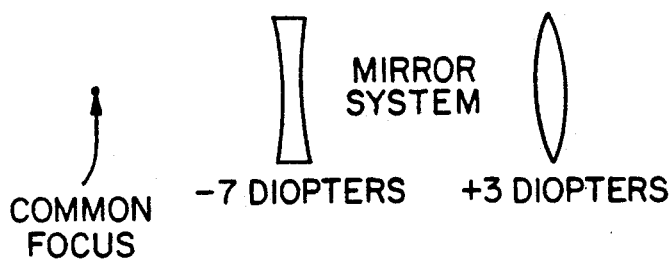
FIG. 9 shows a lens system for the camera attachment of FIG. 5.

The effect of the stereoscopic optical apparatus is to halve the angle of view seen by the camera in the manner of a "×2" zoom lens assembly. This may be compensated for either by making upper mirrors for the camera attachment slightly convex, or by keeping the upper mirrors plain and by placing "×½" wide angle lenses in front. A suitable arrangement is illustrated in FIG. 9 where a convex lens in the camera window shares a common focus with each of two concave lenses which widen the angle of view for left and right eye images. The two path lengths are the same through the mirror system between each of the two concave lenses and the convex lens. The tube in which one of the concave lenses is mounted allows a sliding fit, permitting the focus between the two halves to be equalised. This allows the camera to be used with its focus set at infinity for all the stereoscopic photography. There is an almost unlimited depth of field.

Rotating the viewer apparatus anti-clockwise from above lowers the picture in the field of view. Rotating the viewer on its base clockwise raises the image. Lowering the back of the viewer apparatus rotates the whole picture anti-clockwise. Raising the back of the viewer attachment rotates the picture clockwise. If the viewer attachment is at the same vertical height as the centre of a television screens then a level viewer produces a level picture.

Polarisation of the light leaving each half of a television screen greatly assists in the flexibility of the stereoscopic optical viewer apparatus. Without the polarisation, the stereoscopic optical viewer apparatus may need to be set up for a fixed distance from a television screen, by physically masking off the unwanted mono images. This masking may be effected on the mirrors or at the location of polarising film for the viewer attachment. Another masking technique is to increase the eye to mirror distance until the unwanted images become obscured by the case and mirror geometry. Without the benefit of the polarising film or the masking, three images will be seen one on top of another as will be appreciated from FIG. 4. Only the middle image shown in the combined view in FIG. 4 is in stereo. Interestingly, the brain of the viewer often blots out the mono image from its weakest eye, thereby leaving only two of the three images if blocking is not effected.

It is envisaged that the stereoscopic optical apparatus of the present invention may initially be produced for the home video market. As the stereoscopic optical apparatus becomes more known, then it may be more widely used in television. Broadcast television may be on an occasional basis, for example, if a 3D film were to be transmitted.

Long duration stereoscopic viewing is likely to be easier using the projection system since it allows complete freedom of head movement. It is anticipated that for instance LCD video projectors will soon produce picture resolution comparable with that of a television set.

I claim:

1. Stereoscopic optical apparatus comprising a housing which is constructed to exclude spurious light sources, a pair of first ports in a first face of the housing, a second port in a second face of the housing, first and second optical devices which each have a reflecting surface and which together form a first pair of optical devices, and third and fourth optical devices which each have a reflecting surface and which together form a second pair of optical devices, and the stereoscopic optical apparatus being such that:

(a) the first optical device is positioned below the second optical device;

(b) the first optical device is inclined with respect to horizontal and has an edge which lies in a vertical datum plane extending through an optical centre of the housing;

(c) the first optical device is rotatable about a horizontal axis which is perpendicular to the vertical datum plane such that the said edge of the first optical device remains in the vertical datum plane;

(d) the second optical device has an upper edge which lies in the vertical datum plane;

(e) the second optical device is rotatable about its upper edge;

(f) the second optical device is inclined with respect to the vertical datum plane;

(g) the third optical device is positioned below the fourth optical device;

(h) the third optical device is inclined with respect to horizontal; (i) the third optical device has an edge which lies in the vertical datum plane;

(j) the fourth optical device has a lower edge which lies in the vertical datum plane;

(K) the fourth optical device is rotatable about its lower edge;

(l) the fourth optical device is inclined with respect to the vertical datum plane; and (m) one of the optical devices from the first pair of optical devices and one of the optical devices from the second pair of optical devices being such as to form two optical devices which are on the same level and aligned with said pair of first ports and which have their optical center lines separated by a distance, "d", said pairs of optical devices providing left and right view images of an object that can be detected and recorded, said distance "d" being interpreted by a human brain to be the human interocular distance when said recorded left and right images are viewed by left and right human eyes respectively;

the stereoscopic optical apparatus being such that it is able to operate in a recording mode for recording images in a camera when the first ports are used as entry ports and the second port is used as an exit port, and the stereoscopic optical apparatus being such that it is able to operate in a viewing mode for translating an electronic or photographic display into a human viewable form when the first ports are used as exit ports and the second port is used as an entry port.

2. Stereoscopic optical apparatus according to claim 1 in which the housing has a matt black inner surface.

3. Stereoscopic optical apparatus according to claim 1 in which the first, second, third and fourth optical devices are each a mirror.

4. Stereoscopic optical apparatus according to claim 1 and including correction means for ensuring that two separate images which are obtained during use of the stereoscopic optical apparatus are such that all lines seen to be vertical in one of the images are parallel with corresponding lines in the other image.

5. Stereoscopic optical apparatus according to claim 4 in which the correction means permits the third optical device to be rotatably adjustable about its edge which lies in the vertical datum plane.

* * * * *